(12) United States Patent
Ibe

(10) Patent No.: US 8,229,513 B2
(45) Date of Patent: Jul. 24, 2012

(54) IT TERMINAL AND AUDIO EQUIPMENT IDENTIFICATION METHOD THEREFOR

(75) Inventor: Yukiyasu Ibe, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 1197 days.

(21) Appl. No.: 11/352,297

(22) Filed: Feb. 13, 2006

(65) Prior Publication Data

US 2006/0182047 A1 Aug. 17, 2006

(30) Foreign Application Priority Data

Feb. 17, 2005 (JP) ................................. 2005-040297

(51) Int. Cl.
*H04M 1/00* (2006.01)
(52) U.S. Cl. .......... 455/569.1; 381/58; 381/74; 381/111
(58) Field of Classification Search ............... 340/146.2; 455/73, 550.1, 569.1; 381/58, 74, 111, 370, 381/384; 439/577, 669
See application file for complete search history.

(56) References Cited

U.S. PATENT DOCUMENTS

| | | | | |
|---|---|---|---|---|
| 4,741,035 A | * | 4/1988 | Genuit | 381/26 |
| 5,065,432 A | * | 11/1991 | Sasaki et al. | 381/61 |
| 6,941,060 B1 | * | 9/2005 | Nagaishi et al. | 386/201 |
| 2004/0041911 A1 | * | 3/2004 | Odagiri et al. | 348/207.1 |
| 2004/0080440 A1 | * | 4/2004 | Su et al. | 341/141 |
| 2005/0149215 A1 | * | 7/2005 | Deshpande | 700/94 |
| 2006/0136596 A1 | * | 6/2006 | Izumi | 709/230 |

FOREIGN PATENT DOCUMENTS

| | | |
|---|---|---|
| JP | 08-163686 | 6/1996 |
| JP | 09-148861 | 6/1997 |
| JP | 09-307990 | 11/1997 |
| JP | 2002-101491 | 4/2002 |
| JP | 2002-141980 | 5/2002 |

\* cited by examiner

*Primary Examiner* — Patrick Edouard
*Assistant Examiner* — Matthew Genack
(74) *Attorney, Agent, or Firm* — Young & Thompson

(57) ABSTRACT

Disclosed are a method and an apparatus for identifying audio equipment plugs to be connected to a jack interface of an IT terminal including a common jack interface for a headphone, an earphone microphone and a stereo microphone and for automatically providing appropriate setup. An audio CODEC 50 is connected by way of an input/output selector circuit 42 to a jack interface 10 to which an audio equipment plug 70 is to be connected. Also connected to the LEFT and RIGHT signal terminals of the jack interface 10 is an R-V conversion circuit 20. The output voltages V-LEFT 201 and V-RIGHT 202 from the R-V conversion circuit 20 are compared with a reference voltage by comparator circuits 31, 32 for controlling controllers 41, 51 of an input/output selector circuit 42 and an audio CODEC 50 by the comparison outputs.

9 Claims, 7 Drawing Sheets

FIG. 3

|  | HEADPHONE | EARPHONE MICROPHONE | STEREO MICROPHONE |
|---|---|---|---|
| LEFT CHANNEL | <SPEAKER FUNCTION><br>R1(Ω)=SMALL<br>V-LEFT (V)=LOW | <MICROPHONE FUNCTION><br>R1(Ω)=LARGE<br>V-LEFT (V)=HIGH | <MICROPHONE FUNCTION><br>R1(Ω)=LARGE<br>V-LEFT (V)=HIGH |
| RIGHT CHANNEL | <SPEAKER FUNCTION><br>R2(Ω)=SMALL<br>V-RIGHT (V)=LOW | <SPEAKER FUNCTION><br>R2(Ω)=SMALL<br>V-RIGHT (V)=LOW | <MICROPHONE FUNCTION><br>R2(Ω)=LARGE<br>V-RIGHT (V)=HIGH |

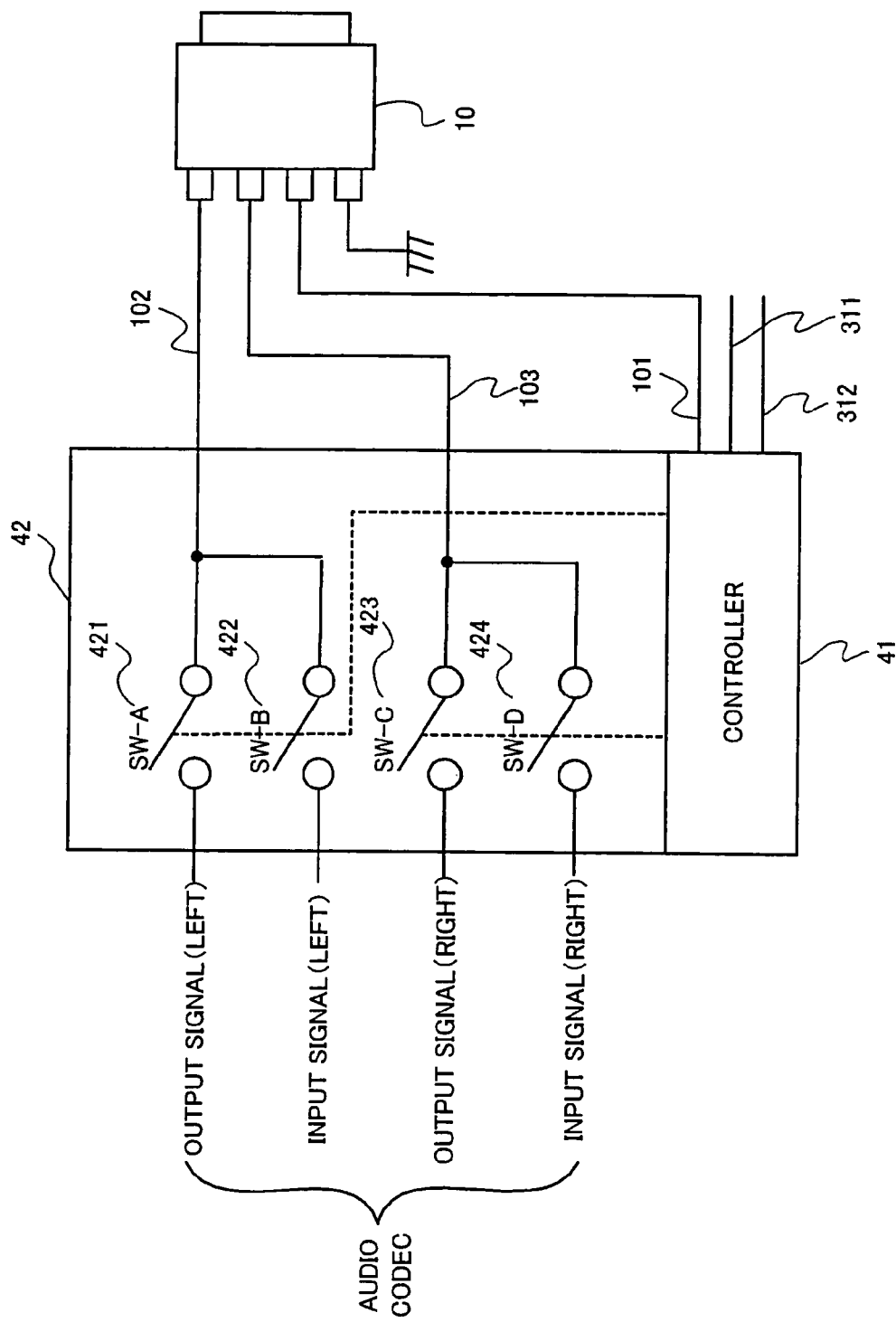

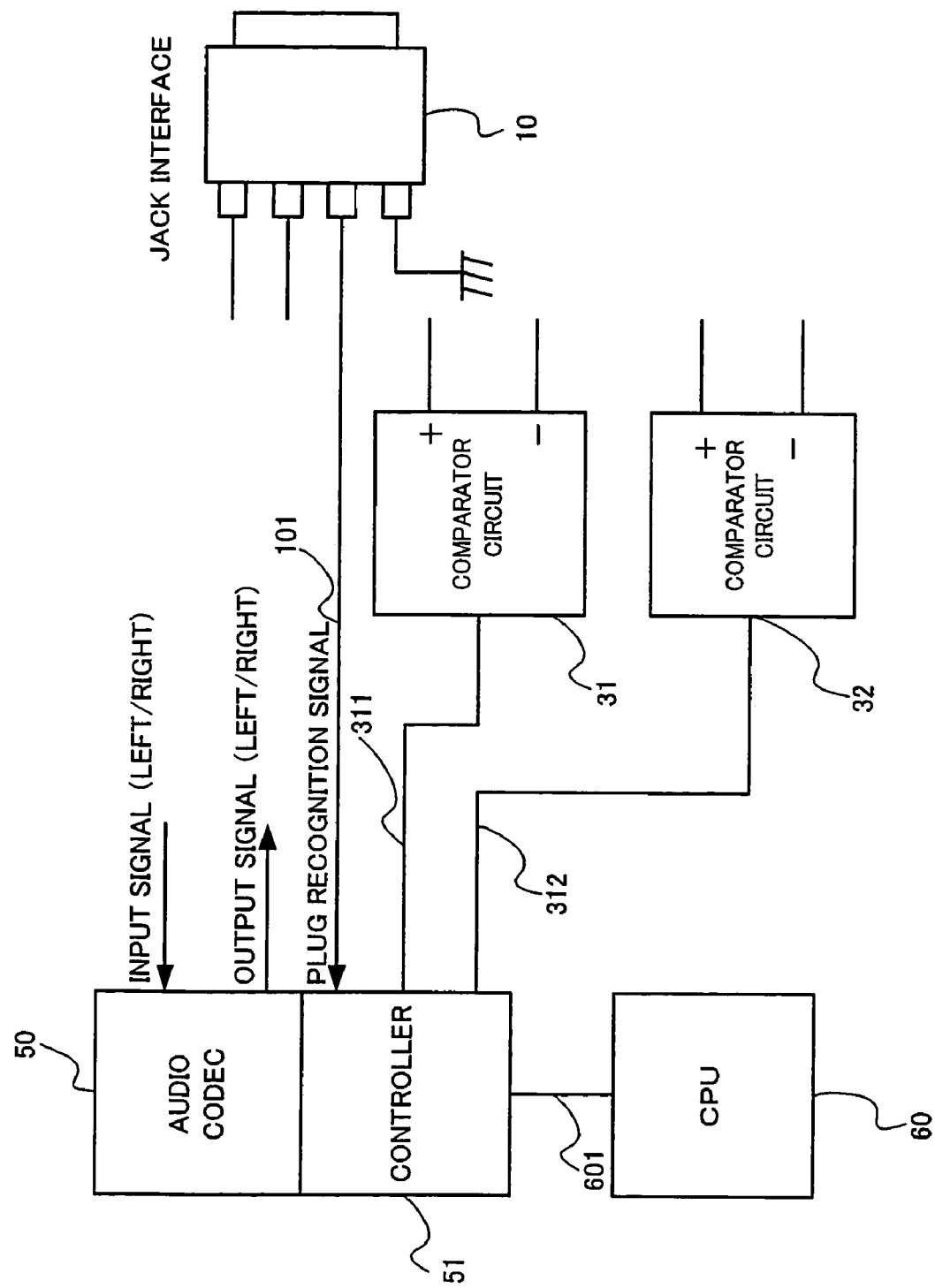

IT TERMINAL AND AUDIO EQUIPMENT IDENTIFICATION METHOD THEREFOR

BACKGROUND OF THE INVENTION

The present invention relates to an IT terminal, more specifically to a portable type IT terminal having a built-in audio function and a method of identifying plural kinds of audio equipment to be connected to a communized jack interface.

As a result of technical development of key technologies such as communication technology and semiconductor technology, compact and high performance portable IT (Information Technology) terminals such as notebook type PCs (Personal Computers) and PDA (Personal Digital Assistants) have been developed and are rapidly popularized. By the use of such IT terminal, information such as various data and the like stored in an internal memory is available to a user by easily reading out of the memory as well as making various information such as, for example, desired music available by transmitting to a computer in an office or at home by way of a wireless communication network or by downloading through an internet or the like. IT terminals having such audio function are increasingly popularized.

For example, in a notebook type PC, since the physical size is rather large, it has various built-in audio plugs such as a headphone, a microphone, a line-in and the like. It is therefore possible to install mating plural jack interfaces and corresponding circuitries. However, in a portable IT terminal such as a PDA or the like that is considerably smaller than the notebook type PC, it has strict physical restriction and is typical to install only a single interface such as a headphone or a microphone.

Conventional technologies relating to or associated with IT terminals are disclosed in some technical documents. Disclosed is an audio signal processing apparatus and a portable telephone equipped with a stereo headphone and a microphone to cope with stereo audio processing by distinguishing them (refer to, for example, JP2002-101491 A1). Also disclosed are a method and an apparatus for signal path switching for a portable telephone equipped with a plug detector for detecting whether the plug connected to a jack terminal for earphone microphone is a plug for earphone microphone or a plug for stereo headphone (refer to, for example, JP2002-141980 A1).

Also disclosed is an input/output circuit for audio equipment in which a common connection jack for headphone and for microphone is provided so as to be used in common by switching after distinguishing the connected headphone or microphone (refer to, for example, JP48-163686 A1). Moreover, in an audio equipment such as a tape recorder or the like, disclosed is a signal input/output circuit for audio equipment for achieving compact design by using a single connection jack for both of a connection jack for stereo headphone and a connection jack for monaural microphone (refer to, for example, JP49-307990A1).

As described hereinabove, a conventional portable IT terminal (such as a notebook PC, a PDA, etc.) is equipped with a jack interface for an optional headphone or a microphone. A notebook PC has a sufficient physical size to provide a plurality of jack interfaces for a headphone, a microphone and the like to be used in combination with various audio equipment and independent circuitries therefor. However, a portable IT terminal such as a PDA or the like is smaller and thus it is physically difficult to provide a plurality of jack interfaces. It is therefore typical to provide only a single jack interface having a single function for a headphone or a microphone.

Nevertheless, as a result of advancement of multi-media functions and a solution system even in a compact portable IT terminal, there are needs for adapting various audio equipments such as a headphone, an earphone microphone, a stereo microphone, etc. Accordingly, while maintaining compact design of a portable IT terminal, it is necessary to provide a multi-function type jack interface and circuitries capable of handling such various audio equipments and software capable of properly setting a speaker volume and microphone gain depending on the audio equipment connected thereto. Unfortunately, however, conventional technologies fail to comfortably satisfy the needs.

SUMMARY OF THE INVENTION

It is therefore an object of the present invention to overcome the above problems of the conventional technologies and to provide an IT terminal and an audio equipment identifying method capable of solving or reducing the above problems.

In order to solve the above problems, the IT terminal and the audio equipment identifying method according to the present invention employ the following unique constructions.

(1) An IT terminal having a built-in audio equipment including a common jack interface to which a plural kinds of audio equipment can be connected, an input/output selector circuit to be connected to the jack interface and an audio CODEC to be connected to the input/output selector circuit, comprising:

a conversion circuit connected in the LEFT signal path and the RIGHT signal path between the jack interface and the input/output selector circuit for converting the impedance of the audio equipment plug to be connected to the jack interface into a corresponding voltage; and comparator circuits for comparing the outputs voltage of the conversion circuit with a reference voltage;

wherein the input/output selector circuit and a controller of the audio CODEC are controlled based on the comparison outputs of the comparator circuits.

(2) An IT terminal of the above (1), wherein further provided is a CPU connected to a controller of the audio CODEC so that the CPU performs appropriate processing in response to the kind of audio equipment identified based on the interruption signal from the controller.

(3) An IT terminal of the above (1) or (2), wherein the comparator circuits comprise a pair of comparators for comparing V-LEFT voltage and V-RIGHT voltage from the R-V conversion circuit with a reference voltage and providing a "High" or a "Low" logic output.

(4) An IT terminal of either one of the above (1)-(3), wherein the jack interface is designed to be connected to a headphone, an earphone microphone or a stereo microphone.

(5) An audio equipment identifying method for IT terminal for identifying kinds of audio equipment to be connected to a jack interface of a portable IT terminal having a built-in audio function including the jack interface common to a plurality of audio equipment, comprising the steps of:

obtaining V-LEFT and V-RIGHT voltages corresponding to resistances (or impedances) for LEFT channel and RIGHT channel of an audio equipment plug to be connected to the jack interface;

comparing the V-LEFT and V-RIGHT voltages with a reference voltage; and identifying the kind of the audio equipment connected to the jack interface based on the combinations of the comparison outputs.

(6) An audio equipment identifying method for IT terminal of the above (5), further comprising a step for interrupting the CPU based on the result of identification of the audio equipment for setting a speaker volume and a microphone gain in response to the identified audio equipment.

(7) An audio equipment identifying method for IT terminal for identifying three kinds of headphone, earphone microphone and stereo microphone to be connected to a jack interface of the IT terminal having a built-in audio function including a single jack interface, comprising steps of:

converting impedances at the LEFT channel and the RIGHT channel of the audio equipment plug connected to the jack interface into corresponding voltages; and automatically identifying the headphone, the earphone microphone or the stereo microphone based on the both voltages obtained in the conversion step.

(8) An audio equipment identifying method for IT terminal of the above (7) further comprising a step of converting the both voltages converted in the conversion step into logic signals and obtaining the combination of the logic signals.

BRIEF DESCRIPTION OF THE DRAWINGS

In the accompanying drawings,

FIG. 3 is a chart to determine if the plug of an audio equipment in FIG. 2 is either a headphone, a earphone microphone or a stereo microphone;

FIG. 6 is a schematic to describe the input/output selector circuit as shown in FIG. 1; and FIG. 7 is a schematic to describe the operation of the audio codec as shown in FIG. 1.

DESCRIPTION OF PREFERRED EMBODIMENTS

Now, preferred embodiments of the IT terminal, the audio equipment identifying method and the input/output switching circuit according to the present invention will be described in greater detail with reference to the accompanying drawings.

Figure 1:
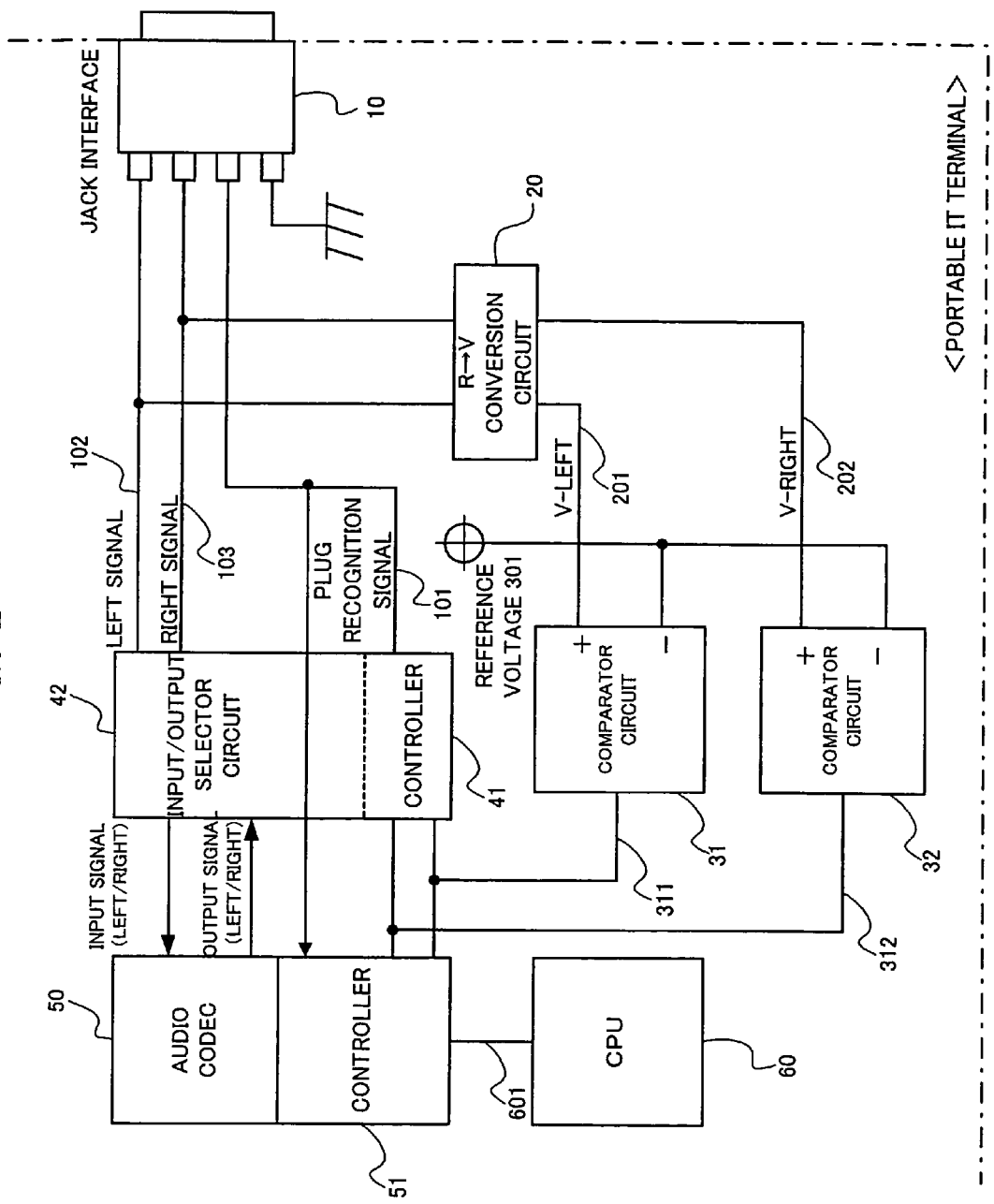
FIG. 1 is a functional block diagram to show the construction of a preferred embodiment of the IT terminal according to the present invention.

Firstly, FIG. 1 is a functional block diagram to show the construction of a preferred embodiment of the IT terminal (or portable IT terminal) according to the present invention. The IT terminal comprises a jack interface 10, an R-V (resistance or impedance to voltage) conversion circuit 20, a pair of comparator circuits 31, 32, a controller 41, an input/output selector circuit 42, an audio CODEC 50 including a controller 51 and a CPU (Central Processing Unit) 60.

In the IT terminal, the jack interface 10 is designed to be connected to a plug of an audio equipment. The R-V conversion circuit 20 converts left channel (L-CH) signal 102 and a right channel (R-CH) signal 103 into a voltage value based on their impedance characteristic. The first comparator circuit 31 compares an L-CH voltage value (V-LEFT) 201 converted by the R-V conversion circuit 20 with a reference voltage. On the other hand, the second comparator circuit 32 compares an R-CH voltage value (V-RIGHT) converted by the R-V conversion circuit 20 with the reference voltage 202. The input/output selector circuit 42 receives at its controller 41 outputs 311 and 312 from the first comparator circuit 31 and second comparator circuit, respectively. The controller 41 also receives a plug recognition signal of the jack interface 10. The input/output selector circuit 42 connects each input/output signal of the audio CODEC 50 to the LEFT signal 102 and the RIGHT signal 103 of the jack interface 10. The controller 51 of the audio CODEC 50 outputs an interrupt signal 601 to the CPU 60 for performing interrupt processing. The CPU 60 sets input/output values (for example, the output volume of the speaker, the input gain of the microphone and the like) which are most suitable to the type of the recognized audio equipment.

Incidentally, a plug for the audio equipment is generally a three-polarity type and a plug to be connected to the jack interface 10 has an L-CH, an R-CH and a GND (ground). And a headphone has speaker outputs as the L/R-CH signals, an earphone microphone has a microphone input as an L-CH signal and a speaker output as an R-CH signal and a stereo microphone has microphone inputs as the L/R-CH signals.

Now, the operation of the IT terminal as shown in FIG. 1 will be described. Upon connecting a plug of an audio equipment to the jack interface 10 of the IT terminal having the functions and circuitries as shown in FIG. 1, the LEFT signal 102 and the RIGHT signal 103 of the jack interface 10 are converted into the voltage values, i.e., the V-LEFT 201 and the V-RIGHT 202 based on the impedance characteristic of each pin function (a microphone or a speaker) of the plug of the audio equipment in the manner as shown in FIGS. 2 and 3.

Figure 2:
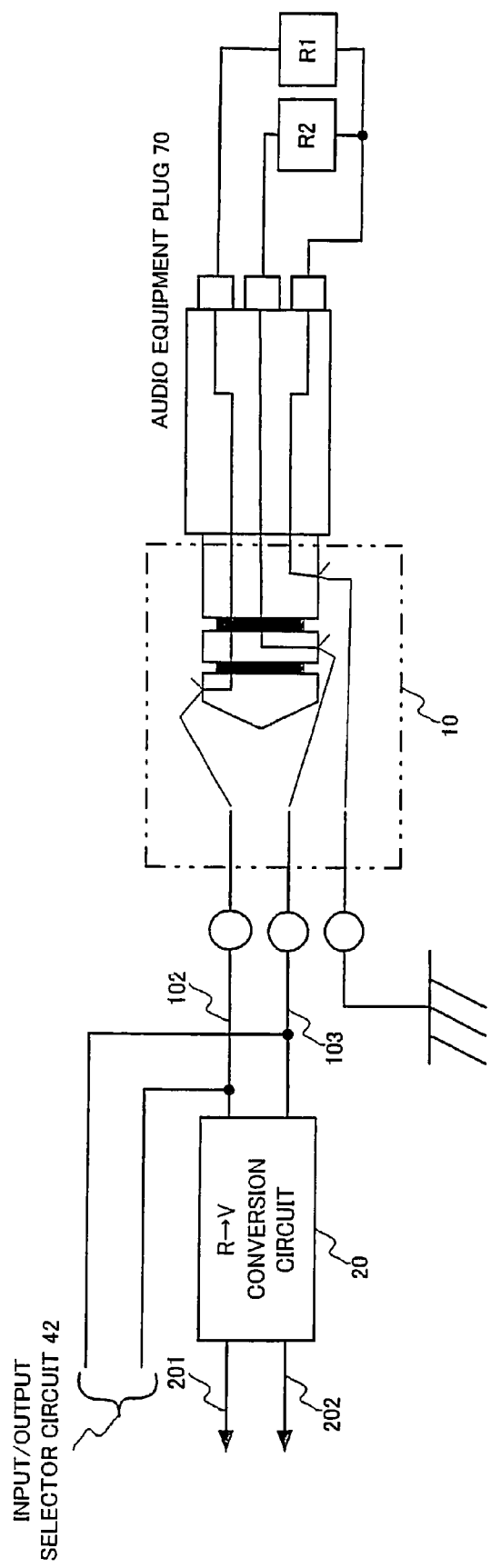
FIG. 2 is a drawing to describe the IT terminal as shown in FIG. 1 having a jack interface connected to a plug of an audio equipment.

FIG. 2 shows a part of the IT terminal as shown in FIG. 1 and a condition when an audio equipment plug 70 is connected to the jack interface 10. On the other hand, FIG. 3 is a table to show L-CH resistance (or impedance) and R-CH resistance (or impedance) values R1 and R2 when a headphone, an earphone and a stereo microphone are connected to the jack interface 10, and the voltage values V-LEFT 201 and V-RIGHT 202 to be converted by the R-V conversion circuit 20 based on these values.

As shown in FIG. 3 at the left column, when a headphone is connected, the L-CH resistance R1 for the speaker function is small and thus the V-LEFT 201 is low. Similarly, the R-CH resistance R2 for the speaker function is also small and thus the V-RIGHT 202 is low. On the other hand, in case of an earphone as shown at the middle column, the L-CH resistance R1 for microphone function is large and thus the V-LEFT 201 is high, but the R-CH resistance for speaker function is small and thus the V-RIGHT 202 is low. On the other hand, in case of a stereo microphone as shown at the right column, the L-CH resistance R1 for microphone function is large and thus the V-LEFT 201 is large and the R-CH resistance R2 for microphone function is also large and thus the V-RIGHT 202 is high.

Figure 4:
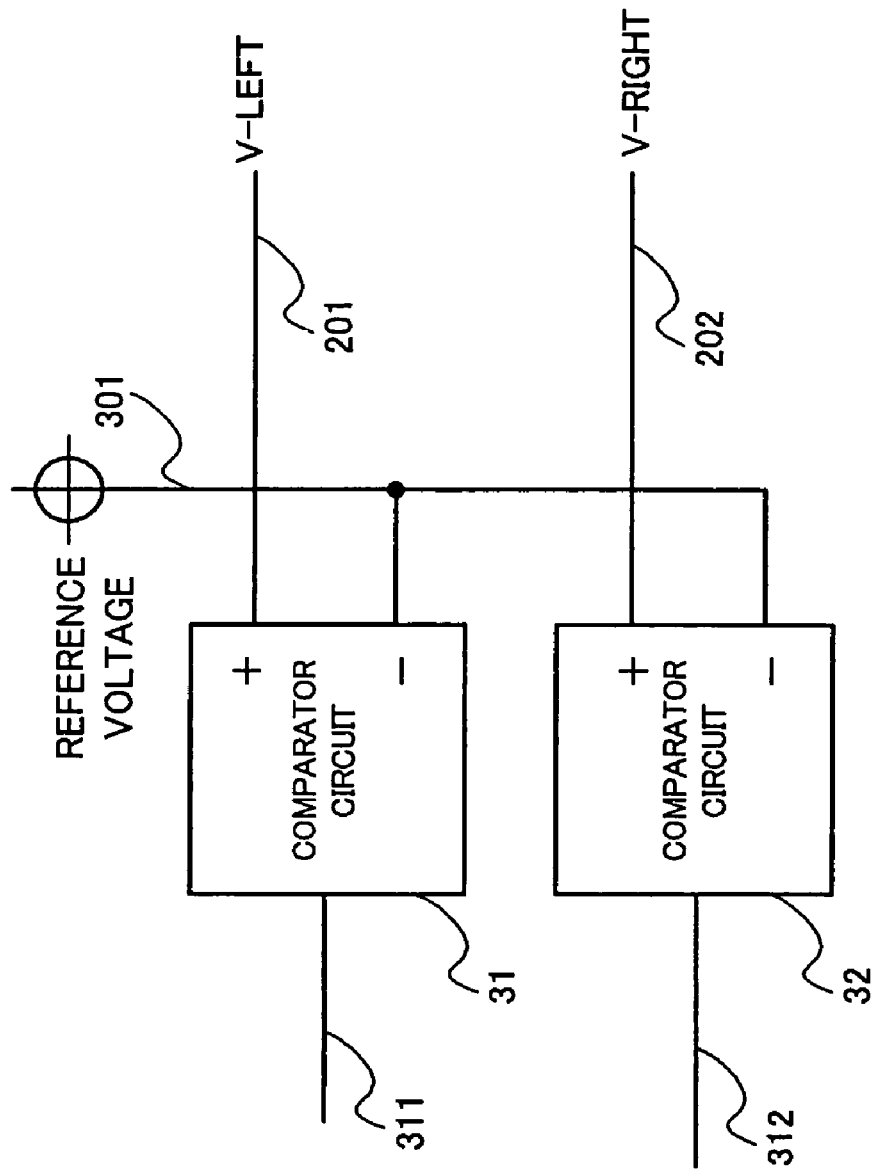
FIG. 4 is a diagram to make a decision by the IT terminal a shown in FIG. 1 based on the result as shown in FIG. 3.
Figure 5:
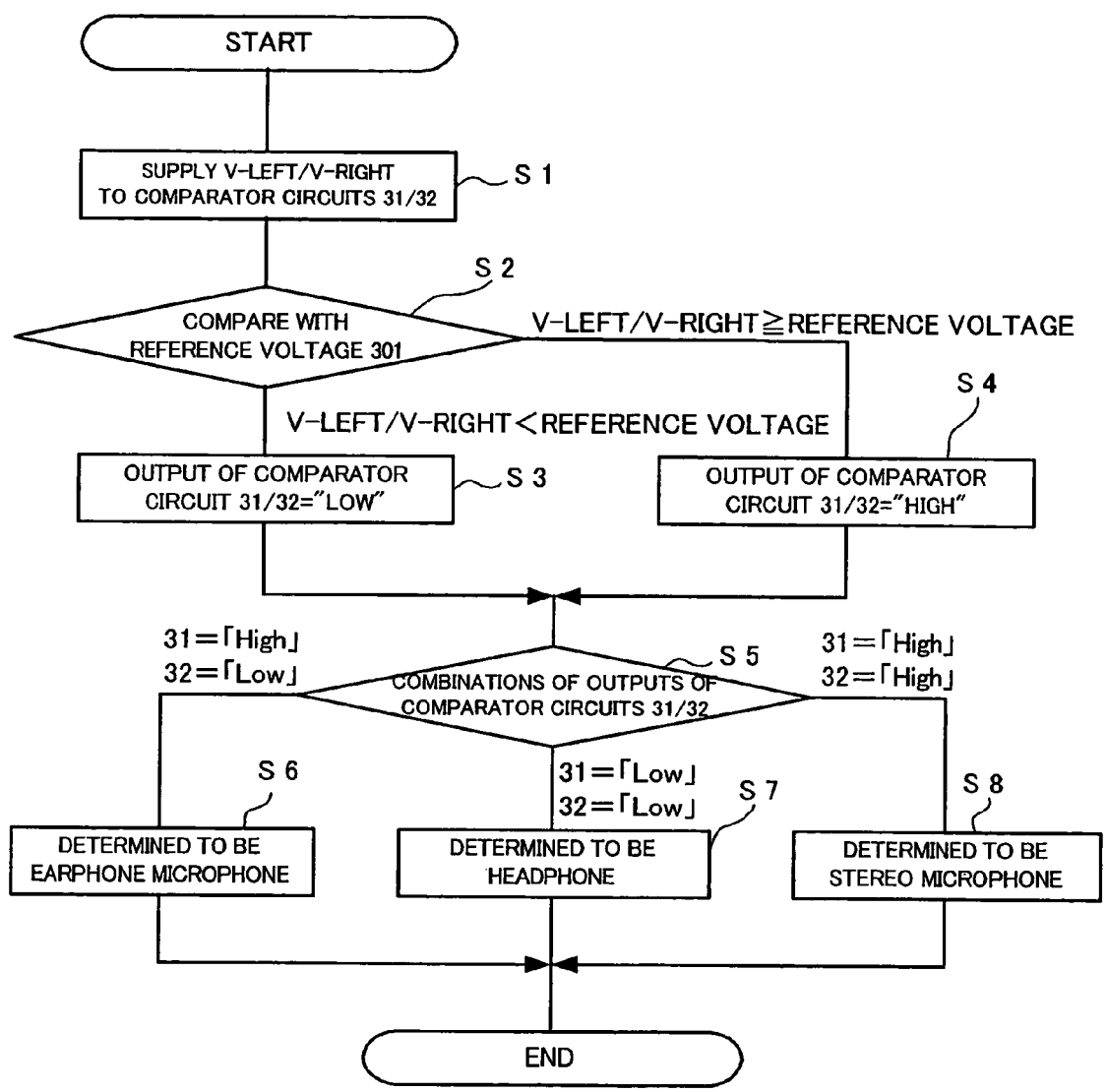
FIG. 5 is a flowchart to describe the audio equipment identifying method for IT terminal according to the present invention.

The V-LEFT 201 and the V-RIGHT 202 as shown in FIG. 3 are respectively inputted to non-inverting input terminals of the first comparator circuit 31 and the second comparator circuit 32 as shown in FIG. 4 for making comparison with the voltage value of a reference voltage 301 as applied to inverting input terminals. The comparison operation of the first comparator circuit 31 and the second comparator circuit 32 will be described hereunder with reference to the flowchart as shown in FIG. 5.

Firstly, applied to the first comparator circuit 31 and the second comparator circuit 32 are the V-LEFT 201 and the V-RIGHT 202 from the R-V conversion circuit 20 (step S1). The first comparator circuit 31 and the second comparator circuit 32 compare the V-LEFT 201 and the V-RIGHT 202 with the reference voltage 301 (step S2). If the V-LEFT 201 or the V-RIGHT 202 is lower than the reference voltage 301, the output 311 or 312 of the first comparator circuit 31 or the second comparator circuit 32 is "Low" (step S3). On the other hand, if the V-LEFT 201 or the V-RIGHT 202 is higher than the reference voltage 301, the output 311 or 312 of the first comparator circuit 31 or the second comparator circuit 32 is "High" (step S4).

Now, a judgment is made of the combination of the output 311 of the first comparator circuit 31 and the output 312 of the second comparator circuit 32 (step S5). If the output 201 of the first comparator circuit 31 is "High" and the output 202 of the second comparator circuit 32 is "Low", a decision is made to be an earphone microphone (step S6). On the other hand, if the both outputs 201 and 202 of the first and second comparator circuits 31 and 32 are "Low", a decision is made to be a headphone (step S7). If the both outputs 201 and 202 of the first and second comparator circuits 31 and 32 are "High", a decision is made to be a stereo microphone (step S8). In this manner, it is possible to distinguish audio equipment, i.e., a headphone, an earphone microphone and a stereo microphone to be connected to the jack interface 10.

Now, FIG. 6 is a detailed schematic of a portion of the IT terminal in FIG. 1 including the jack interface 10, the input/output selector circuit 42 for an audio signal and the controller 41 for controlling the selector circuit 42. The plug recognition signal 101, the output signal 311 of the first comparator circuit 31 and the output 312 of the second comparator circuit 32 are supplied to the controller 41 for the purpose of preventing circuit malfunction when no audio equipment is connected.

As shown in FIG. 6, the input/output selector circuit 42 includes four switches, i.e., LEFT signal output/input switches SW-A 421, SW-B 422 and RIGHT signal output/input switches SW-C 423, SW-D 424. It is to be noted here that the controller 41 provides suitable connection paths to audio equipment by properly switching SW-A to SW-D 421, 422, 423 and 424 in the input/output selector circuit 42 as shown in FIG. 6 based on the distinguished type of the audio equipment connected to the jack interface 10 or the combination of the output signals 311 and 312 of the first comparator circuit 31 and the second comparator circuit 32 as described hereinabove with reference to the flowchart in FIG. 5.

The switches SW-A 421 and the SW-C 423 in FIG. 6 are turned ON in case of a headphone, the switches SW-B 422 and the SW-C 423 in FIG. 6 are turned on in case of an earphone, and the SW-B 422 and SW-D 424 in FIG. 6 are turned on in case of a stereo microphone.

As described hereinabove with reference to FIG. 6, the LEFT signal 102 and the RIGHT signal 103 are properly supplied to the jack interface 10 in accordance with the audio equipment connected to the jack interface 10.

Moreover, as shown in FIG. 7, the comparison output signal 311 of the first comparison circuit 31 and the comparison output 312 of the second comparator output 32 are supplied to the controller 51 of the audio CODEC 50 together with the plug recognition signal 101 from the jack interface 10. Upon connecting the audio equipment plug 70 to the jack interface 10 of the IT terminal and recognizing the connection of the audio equipment, the controller 51 outputs an interruption signal 601 to the CPU 60 for performing an interruption operation. That is, upon receiving the interruption signal 601, the CPU 60 makes a judgment of the audio equipment connected to the jack interface 10 based on the comparison output signals 311 and 312 of the first and second comparator circuits 31 and 32 that are supplied to the controller 51 of the audio CODEC 50. And the operation will be initiated with proper software settings (for example, the output volume, the input gain and the like).

The construction and the operation of preferred embodiments of the IT terminal and the audio equipment identifying method according to the present invention have been described in greater detail. It is to be noted, however, that the embodiments are nothing but mere examples and that the present invention should not be limited to such embodiments. Various modifications and alternations can be made easily by a person having an ordinary skill in the art for particular applications without departing from the scope and spirit of the present invention.

For example, although kinds of the audio equipment to be automatically identified are a headphone, an earphone microphone and a stereo microphone in the above embodiments, the present invention can be applied to other audio equipment having the microphone function and the speaker function. Although the output level changes, it is also possible to supply the outputs of the first and second comparators to the inverting input terminals without causing adverse effect on the operation of the present invention by proper logic design of the controller of the selector circuit

What is claimed is:

1. An IT terminal having a built-in audio equipment including a common jack interface to which a plural kinds of audio equipment can be connected, an input/output selector circuit to be connected to the jack interface and an audio CODEC to be connected to the input/output selector circuit, comprising:
   a conversion circuit connected in a LEFT signal path and a RIGHT signal path between the jack interface and the input/output selector circuit for converting an impedance of an audio equipment plug to be connected to the jack interface into a corresponding voltage, and outputting V-LEFT voltage corresponding to the impedance of a LEFT channel of the audio equipment and V-RIGHT voltage corresponding to the impedance of a RIGHT channel of the audio equipment;
   comparator circuits for comparing the V-LEFT voltage of the conversion circuit with a reference voltage and comparing the V-RIGHT voltage of the conversion circuit with the reference voltage; and
   a CPU connected to a controller of the audio CODEC and performs processing in response to the kind of audio equipment identified based on outputs from the comparator circuits,
   wherein the CPU identifies the audio equipment as a headphone upon the V-LEFT voltage being lower than the reference voltage and the V-RIGHT voltage is lower than the reference voltage,
   the CPU identifies the audio equipment as a stereo microphone upon the V-LEFT voltage being higher than the reference voltage and the V-RIGHT voltage is higher than the reference voltage, and
   the CPU identifies the audio equipment as an earphone microphone upon the V-LEFT voltage being higher than the reference voltage and the V-RIGHT voltage being lower than the reference voltage.

2. An IT terminal of claim 1, wherein the comparator circuits comprise a pair of comparators for comparing V-LEFT voltage and V-RIGHT voltage from the conversion circuit with a reference voltage and providing a "High" or a "Low" logic output.

3. An IT terminal of claim 1, wherein the jack interface is designed to be connected to the headphone, the earphone microphone or the stereo microphone.

4. An audio equipment identifying method for IT terminal for identifying kinds of audio equipment to be connected to a jack interface of a portable IT terminal having a built-in audio function including the jack interface common to a plurality of audio equipment, comprising the steps of:

obtaining V-LEFT voltage corresponding to the impedance of a LEFT channel of the audio equipment and V-RIGHT voltage corresponding to the impedance of a RIGHT channel of the audio equipment;

comparing the V-LEFT and V-RIGHT voltages with a reference voltage; and identifying the kind of the audio equipment connected to the jack interface based on the combinations of the comparison outputs, wherein the audio equipment is identified as a headphone upon the V-LEFT voltage being lower than the reference voltage and the V-RIGHT voltage being lower than the reference voltage, the audio equipment is identified as a stereo microphone upon the V-LEFT voltage being higher than the reference voltage and the V-RIGHT voltage being higher than the reference voltage, and the audio equipment is identified as an earphone microphone upon the V-LEFT voltage being higher than the reference voltage and the V-RIGHT voltage being lower than the reference voltage.

5. An audio equipment identifying method for IT terminal of claim 4, further comprising a step for interrupting a CPU based on the result of identification of the audio equipment for setting a speaker volume and a microphone gain in response to the identified audio equipment.

6. An audio equipment identifying method for IT terminal for identifying three kinds of headphone, earphone microphone and stereo microphone to be connected to a jack interface of the IT terminal having a built-in audio function including a single jack interface, comprising steps of:

converting impedances at the LEFT channel and the RIGHT channel of the audio equipment plug connected to the jack interface into corresponding voltages, the corresponding voltage of the LEFT channel is V-LEFT voltage and the corresponding voltage of the RIGHT channel is V-RIGHT voltage;

comparing the V-LEFT and V-RIGHT voltages with a reference voltage; and automatically identifying the headphone, the earphone microphone or the stereo microphone based on the combinations of the comparison outputs, wherein the audio equipment is identified as a headphone upon the V-LEFT voltage being lower than the reference voltage and the V-RIGHT voltage being lower than the reference voltage, the audio equipment is identified as a stereo microphone upon the V-LEFT voltage being higher than the reference voltage and the V-RIGHT voltage being higher than the reference voltage, and the audio equipment is identified as an earphone microphone upon the V-LEFT voltage being higher than the reference voltage and the V-RIGHT voltage being lower than the reference voltage.

7. An audio equipment identifying method for IT terminal of claim 6 further comprising a step of converting the both voltages converted in the conversion step into logic signals and obtaining the combination of the logic signals.

8. The IT terminal according to claim 1, wherein the input/output selector circuit and the controller of the audio CODEC receive the output voltages of the comparator circuits simultaneously.

9. The IT terminal according to claim 1, wherein the input/output selector circuit directly receives input from and directly outputs to the audio CODEC, and the audio CODEC directly receives input from or directly outputs to a single input/output selector.

\* \* \* \* \*